US012365797B2

(12) United States Patent
Park et al.

(10) Patent No.: US 12,365,797 B2
(45) Date of Patent: Jul. 22, 2025

(54) RESIN COMPOSITION

(71) Applicant: LG Chem, Ltd., Seoul (KR)

(72) Inventors: Hyoung Sook Park, Daejeon (KR); Se Woo Yang, Daejeon (KR); Yoon Gyung Cho, Daejeon (KR); Yang Gu Kang, Daejeon (KR); Eun Suk Park, Daejeon (KR); Hyun Suk Kim, Daejeon (KR); Sang Min Park, Daejeon (KR); Young Jo Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 815 days.

(21) Appl. No.: 17/441,912

(22) PCT Filed: Mar. 27, 2020

(86) PCT No.: PCT/KR2020/004173
§ 371 (c)(1),
(2) Date: Sep. 22, 2021

(87) PCT Pub. No.: WO2020/197309
PCT Pub. Date: Oct. 1, 2020

(65) Prior Publication Data
US 2022/0017745 A1 Jan. 20, 2022

(30) Foreign Application Priority Data

Mar. 27, 2019 (KR) ........................ 10-2019-0035031

(51) Int. Cl.
*C08L 75/06* (2006.01)
*C08G 18/10* (2006.01)
*C08G 18/42* (2006.01)
*C08K 3/22* (2006.01)
*C08K 5/524* (2006.01)
*H01M 50/204* (2021.01)
*H01M 50/227* (2021.01)
*H01M 50/24* (2021.01)

(52) U.S. Cl.
CPC ............. *C08L 75/06* (2013.01); *C08G 18/10* (2013.01); *C08G 18/4241* (2013.01); *C08G 18/4277* (2013.01); *C08K 3/22* (2013.01); *C08K 5/524* (2013.01); *H01M 50/204* (2021.01); *H01M 50/227* (2021.01); *H01M 50/24* (2021.01); *C08K 2003/2227* (2013.01); *C08K 2201/003* (2013.01); *C08L 2201/02* (2013.01); *H01M 2220/20* (2013.01)

(58) Field of Classification Search
CPC .... C08G 18/10; C08L 75/06; C08K 2201/003
See application file for complete search history.

(56) References Cited

U.S. PATENT DOCUMENTS

| | | | | |
|---|---|---|---|---|
| 5,462,797 A | * | 10/1995 | Williams | ............ C08F 283/006 522/18 |
| 2011/0318511 A1 | * | 12/2011 | Hada | ........................ B41M 5/42 427/551 |
| 2015/0175861 A1 | | 6/2015 | Nagata et al. | |
| 2018/0072927 A1 | | 3/2018 | Lee et al. | |
| 2018/0076493 A1 | | 3/2018 | Park et al. | |
| 2018/0358592 A1 | | 12/2018 | Park et al. | |
| 2019/0309207 A1 | | 10/2019 | Kang et al. | |
| 2020/0006728 A1 | | 1/2020 | Park et al. | |
| 2020/0220124 A1 | | 7/2020 | Park et al. | |

FOREIGN PATENT DOCUMENTS

| | | | | |
|---|---|---|---|---|
| CN | 101575440 A | * | 11/2009 | ........... C08G 59/621 |
| EP | 0533465 A2 | | 3/1993 | |
| EP | 2267081 A1 | | 12/2010 | |
| JP | H09263746 A | | 10/1997 | |
| JP | 2010016286 A | | 1/2010 | |
| JP | 2015103341 A | | 6/2015 | |
| JP | 2017027736 A | | 2/2017 | |
| KR | 100228227 B1 | | 11/1999 | |
| KR | 101202226 B1 | | 11/2012 | |
| KR | 20140111248 A | | 9/2014 | |
| KR | 20160105354 A | | 9/2016 | |
| KR | 20170113466 A | | 10/2017 | |
| KR | 20180125824 A | | 11/2018 | |
| KR | 20190030984 A | | 3/2019 | |
| WO | 2019054798 A1 | | 3/2019 | |

OTHER PUBLICATIONS

Machine translation of CN-101575440-A (Year: 2012).*
International Search Report for Application No. PCT/KR2020/004173, dated Jun. 30, 2020, 3 pages.
Examination Report for corresponding Indian Application No. 202117043245 dated Jan. 12, 2022, 4 pgs.
Extended European Search Report and European Search Opinion for EP Application No. 20776814.4 dated Mar. 9, 2022, 7 pgs.

* cited by examiner

Primary Examiner — Wenwen Cai
(74) Attorney, Agent, or Firm — Lerner David LLP

(57) ABSTRACT

A resin composition, a method for manufacturing the same and a use thereof are provided. The resin composition provides excellent thixotropy while having one or more excellent properties selected from thermal conductivity, adhesiveness, insulation properties, tensile characteristics, hardness and flame retardancy.

11 Claims, 6 Drawing Sheets

RESIN COMPOSITION

CROSS-REFERENCE TO RELATED APPLICATIONS

This application is a national stage entry under 35 U.S.C. § 371 of International Application No. PCT/KR2020/004173 filed on Mar. 27, 2020, which claims priority from Korean Patent Application No. 10-2019-0035031 filed on Mar. 27, 2019, the disclosures of which are incorporated herein by reference in their entirety.

TECHNICAL FIELD

The present application relates to a resin composition, a preparation method therefor and a use thereof.

BACKGROUND ART

Secondary batteries include nickel cadmium batteries, nickel hydride batteries, nickel zinc batteries or lithium secondary batteries, and the like.

When a battery is applied to a medium or large-sized device such as a vehicle or a power storage device, a battery module in which a large number of secondary batteries are electrically connected to each other may be used or a battery pack in which a plurality of such battery modules is connected may be used, in order to increase capacity and output.

In Patent Document 1, the present applicant proposed a method of implementing the battery module and the battery pack as above using a thermally conductive adhesive material.

In forming a battery module using the adhesive material, it is necessary to properly secure thixotropy. The thixotropy is a characteristic in which viscosity changes according to shear stress, where this characteristic may be required when manufacturing a battery module.

However, depending on the resin composition, it is difficult to secure such thixotropy, and in particular, in the case of applying a high content filler to secure functions such as thermal conductivity, or the like, it is more difficult to secure such a characteristic.

(Patent Document 0001) KR Laid-Open Patent Publication No. 2016-0105354

DISCLOSURE

Technical Problem

It is one object of the present application to provide a resin composition securing excellent thixotropy while having one or more excellent properties selected from thermal conductivity, adhesiveness, insulation properties, tensile characteristics, hardness and flame retardancy, a preparation method thereof and a use thereof.

Technical Solution

Among physical properties mentioned in this specification, when the measured temperature and/or pressure affects the physical property value, the relevant physical property means a physical property measured at room temperature and/or normal pressure, unless otherwise specified.

In the present application, the term room temperature is a natural temperature without warming or cooling, which may mean, for example, any temperature in a range of about 10° C. to about 30° C., or a temperature of 25° C. or 23° C. or so. Also, in the present application, unless otherwise specified, the unit of temperature is ° C.

In the present application, the term normal pressure is a natural pressure which is not particularly pressurized or decompressed, which may be, usually, 1 atmosphere or so, like atmospheric pressure.

The present application relates to a resin composition.

In one example, the resin composition may be a curable resin composition. The resin composition may be an active energy ray curing type, a moisture curing type, a heat curing type, or a room temperature curing type, which is, preferably, a room temperature curing type.

In one example, the resin composition may be an adhesive composition. The term adhesive composition may mean a composition designed to be capable of exhibiting adhesiveness over a certain level before or after curing. In one example, the resin composition, which is an adhesive composition, may exhibit adhesiveness of about 1,000 gf/10 mm or less, about 950 gf/10 mm or less, about 900 gf/10 mm or less, about 850 gf/10 mm or less, about 800 gf/10 mm or less, about 750 gf/10 mm or less, about 700 gf/10 mm or less, about 650 gf/10 mm or less, or about 600 gf/10 mm or less before or after curing, and in another example, the adhesiveness may be about 50 gf/10 mm or more, about 70 gf/10 mm or more, about 80 gf/10 mm or more, or about 90 gf/10 mm or more. The adhesiveness may be adhesiveness to aluminum or adhesiveness to a polyester film.

The resin composition may be a one-component resin composition or a two-component resin composition. The term one-component resin composition means a resin composition formed such that it can be cured by itself without mixing with another component, and the two-component resin composition means a resin composition formed such that it can be cured only when it is mixed with another component. In general, the two-component resin composition is stored in a state where a curable resin and a curing agent are separated, and the curable resin and the curing agent must be in contact for curing. In this specification, the term main composition may mean a composition including a curable resin in the two-component resin composition, and the curing agent composition may mean a composition including a curing agent in the two-component resin composition.

In one example, the resin composition may be a resin composition used for manufacturing a battery module or a battery pack. As exemplarily described below, the resin composition is injected into a battery module case in the specific disclosure of the present application, which can be used to contact one or more battery cells present in the battery module and fix the battery cells in the battery module.

The resin composition may comprise a curable resin and/or a curing agent for the resin. In one example, the resin composition may be a main composition including a curing agent in a two-component resin composition, or a curing agent composition including a curing agent. In some cases, the resin composition may comprise, as a composition in a state where the main composition and the curing agent composition are mixed, the curable resin and the curing agent at the same time, where the two components may also be in a state of reacting with each other or a state before the reaction.

The resin may be a polyol compound. In one example, as the polyol compound, an ester polyol compound may be used. The ester polyol is advantageous in making the resin composition exhibit desired physical properties before or after curing.

The ester polyol may be a polyol having amorphousness or sufficiently low crystallinity. In this specification, the term amorphousness may mean a property that a crystallization temperature (Tc) and a melting temperature (Tm) are not confirmed in a predetermined DSC (differential scanning calorimetry) analysis. The DSC analysis may be performed within a temperature range of −80° C. to 60° C., for example, at a temperature increase or decrease rate of 10° C./min. For example, the DSC analysis may be performed in a manner of raising the temperature from 25° C. to 60° C. at the above rate and then reducing the temperature to −80° C., and raising the temperature to 60° C. again. As long as the DSC analysis is performed according to the temperature section and the rate of temperature increase/temperature decrease, the specific performing method follows a known method.

Here, the matter that the polyol has low crystallinity is a case where the melting point (Tm) as identified in the DSC analysis is 15° C. or less, which means a case where in another example, the melting point is less than about 15° C., about 10° C. or less, 5° C. or less, 0° C. or less, about −5° C. or less, −10° C. or less, or about −20° C. or less or so. The melting point may be, for example, about −80° C. or higher, −75° C. or higher, or about −70° C. or higher. When a polyol compound with the above characteristics is applied, desired physical properties such as thixotropy can be more effectively secured.

In one example, as such a polyol compound, a carboxylic acid polyol compound or a caprolactone polyol compound may be used.

The carboxylic acid polyol compound may mean a compound formed by reacting components including a carboxylic acid and a polyol (for example, diol or triol, etc.), and the caprolactone polyol compound may mean a polyol formed by reacting components including caprolactone and a polyol (for example, diol or triol, etc.). At this time, the carboxylic acid may be a dicarboxylic acid.

In one example, the polyol compound may be a polyol compound represented by Formula 1 or 2 below.

[Formula 1]
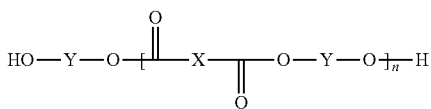

[Formula 2]
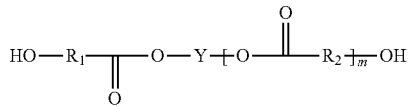

In Formulas 1 and 2, X is a carboxylic acid-derived unit, and Y is a polyol-derived unit. The polyol-derived unit may be, for example, a triol unit or a diol unit. In addition, n and m may be any number, where for example, n is a number in a range of 2 to 10 and m is a number in a range of 1 to 10, and $R_1$ and $R_2$ are each independently alkylene in a range of 1 to 14 carbon atoms.

Here, the term carboxylic acid-derived unit may mean a moiety of a carboxylic acid compound excluding the carboxy group. Similarly, the term polyol-derived unit may mean a moiety of a polyol compound structure excluding the hydroxy group. That is, when a hydroxy group of a polyol and a carboxyl group of a carboxylic acid react, an ester bond is formed while a water ($H_2O$) molecule is eliminated by the condensation reaction. When the carboxylic acid forms the ester bond through the condensation reaction as such, the carboxylic acid-derived unit may mean the moiety of the carboxylic acid structure that does not participate in the condensation reaction. Furthermore, the polyol-derived unit may mean the moiety of the polyol structure that does not participate in the condensation reaction.

In Formula 2, Y also represents a moiety that a polyol and caprolactone form an ester bond and then the ester bond is excluded. That is, in Formula 2, when the polyol and caprolactone form an ester bond, the polyol-derived unit, Y, may mean the moiety of the polyol structure that does not participate in the ester bond. The ester bonds are represented in Formulas 1 and 2, respectively.

In Formulas above, when the polyol-derived unit of Y is a unit derived from a polyol containing three or more hydroxy groups, such as a triol unit, a branched structure may be implemented in the Y portion of the formula structure.

In Formula 1, the type of the carboxylic acid-derived unit of X is not particularly limited, but in order to secure the desired physical properties, it may be a unit derived from one or more compounds selected from the group consisting of a fatty acid compound, an aromatic compound having two or more carboxyl groups, an alicyclic compound having two or more carboxyl groups and an aliphatic compound having two or more carboxyl groups.

The aromatic compound having two or more carboxyl groups may be, for example, phthalic acid, isophthalic acid, terephthalic acid, trimellitic acid or tetrachlorophthalic acid.

The alicyclic compound having two or more carboxyl groups may be, for example, tetrahydrophthalic acid or hexahydrophthalic acid tetrachlorophthalic acid.

The aliphatic compound having two or more carboxyl groups may be, for example, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid or itaconic acid.

An aliphatic carboxylic acid-derived unit may be applied in terms of securing an appropriate glass transition temperature within the above-described range.

In Formulas 1 and 2, the type of the polyol-derived unit of Y is not particularly limited, but in order to secure the desired physical properties, it may be derived from one or more compounds selected from the group consisting of an alicyclic compound having two or more hydroxy groups and an aliphatic compound having two or more hydroxy groups.

The alicyclic compound having two or more hydroxy groups may be, for example, 1,3-cyclohexanedimethanol or 1,4-cyclohexanedimethanol.

The aliphatic compound having two or more hydroxy groups may be, for example, ethylene glycol, propylene glycol, 1,2-butylene glycol, 2,3-butylene glycol, 1,3-propanediol, 1,3-butanediol, 1,4-butanediol, 1,6-hexanediol, neopentyl glycol, 1,2-ethylhexyldiol, 1,5-pentanediol, 1,9-nonandiol, 1,10-decanediol, glycerin or trimethylolpropane.

In Formula 1, n is any number, in which the range may be selected in consideration of the desired physical properties of the resin composition or a resin layer, which is a cured product thereof. For example, n may be about 2 to 10 or 2 to 5.

In Formula 2, m is any number, in which the range may be selected in consideration of the desired physical properties of the resin composition or a resin layer, which is a cured product thereof. For example, m may be about 1 to 10 or 1 to 5.

When n and m in Formulas 1 and 2 increase, the polyol compound becomes a longer chain, and such a longer chain increases the probability that the polyol compound can exhibit crystallinity. Therefore, in order to secure the above-described amorphousness or sufficiently low crystallinity, it is advantageous that n and m are set within the above-described ranges.

In Formula 2, $R_1$ and $R_2$ are each independently alkylene in a range of 1 to 14 carbon atoms. The number of carbon atoms may be selected in consideration of the desired physical properties of the resin composition or the resin layer, which is a cured product thereof.

The molecular weight of the polyol may be adjusted in consideration of durability or adhesiveness as described below, which may be, for example, in the range of about 300 to 2,000. Unless otherwise specified, the term molecular weight herein may be a weight average molecular weight (Mw) measured using GPC (gel permeation chromatograph). When it is out of the above range, the reliability of the resin layer after curing may be poor, or problems related to volatile components may occur.

When the curable resin is a polyol compound, an isocyanate compound may be applied as the curing agent. As the isocyanate compound, a non-aromatic or aromatic isocyanate compound may be used, where the use of the non-aromatic polyisocyanate may be effective when considering the reaction rate, glass transition temperature, processability, and the like, without being limited thereto.

As the non-aromatic isocyanate compound, for example, aliphatic polyisocyanates such as hexamethylene diisocyanate, trimethylhexamethylene diisocyanate, lysine diisocyanate, norbornane diisocyanate, ethylene diisocyanate, propylene diisocyanate or tetramethylene diisocyanate; alicyclic polyisocyanates such as transcyclohexane-1,4-diisocyanate, isophorone diisocyanate, bis(isocyanate methyl) cyclohexane diisocyanate or dicyclohexylmethane diisocyanate; or carbodiimide-modified polyisocyanate or isocyanurate-modified polyisocyanate of the above-listed compounds; and the like may be used. In addition, a mixture of two or more of the above-listed compounds may be used.

When the polyol compound and the isocyanate compound are included in the resin composition at the same time, the ratio is not particularly limited. That is, in general, the hydroxy group of the polyol compound and the isocyanate group of the curing agent react in a 1:1 ratio to perform the curing, and thus an appropriate ratio may be selected in consideration of this.

The resin composition comprises particles together with the curable resin and/or the curing agent. The particles may be non-ceramic particles or organic particles.

The particles may have predetermined hardness. Particles having controlled hardness can impart desired thixotropy to the resin composition. Although not limited to theory, it is expected that the particles form a pulverulent body by contact with other components or contact between particles in the preparation process of the resin composition as described below, and the desired thixotropy is secured by such a pulverulent body.

In one example, the particles may have a change rate of a D50 particle diameter in a range of −95% to −80% after milling for 20 hours with zirconium beads having a particle diameter of 1 mm. Here, when the D50 particle diameter before milling is set to D50i and the D50 particle diameter after milling is set to D50a, the change rate of the D50 particle diameter is a value calculated as 100×(D50a−D50i)/D50i. That is, the particles may have hardness that brings about the D50 particle diameter change rate in the above range on milling by the zirconium beads. In another example, the change rate of the D50 particle diameter may be −94% or more, −93% or more, −92% or more, −91% or more, or −90% or more, or may be −81% or less, −82% or less, −83% or less, −84% or less, −85% or less, −86% or less, −87% or less, or −88% or less.

In one example, the particles may have a change rate of a D10 particle diameter in a range of −85% to −70% after milling for 20 hours with zirconium beads having a particle diameter of 1 mm. Here, when the D10 particle diameter before milling is set to D10i and the D10 particle diameter after milling is set to D10a, the change rate of the D10 particle diameter is a value calculated as 100×(D10a−D10i)/D10i. That is, the particles may have hardness that brings about the D10 particle diameter change rate in the above range on milling by the zirconium beads. In another example, the change rate of the D10 particle diameter may be −84% or more, −83% or more, −82% or more, −81% or more, or −80% or more, or may be −71% or less, −72% or less, −73% or less, −74% or less, −75% or less, −76% or less, −77% or less, or −78% or less.

In one example, the particles may have a change rate of a D90 particle diameter in a range of −95% to −80% after milling for 20 hours with zirconium beads having a particle diameter of 1 mm. Here, when the D90 particle diameter before milling is set to D90i and the D90 particle diameter after milling is set to D90a, the change rate of the D90 particle diameter is a value calculated as 100×(D90a−D90i)/D90i. That is, the particles may have hardness that brings about the D90 particle diameter change rate in the above range on milling by the zirconium beads. In another example, the change rate of the D90 particle diameter may be −94% or more, −93% or more, or −92% or more, or may be −81% or less, −82% or less, −83% or less, −84% or less, −85% or less, −86% or less, −87% or less, −88% or less, −89% or less, −90% or less, or −91% or less.

The D10, D50 and D90 particle diameters as mentioned above are particle diameters at volume-based accumulation of 10%, 50%, and 90%, respectively, in the volume-based cumulative curve of the particle size distribution, and a method of obtaining such a particle diameter is known. For example, in the cumulative curve with the total volume as 100%, the particle diameters at the points where the cumulative values are 10%, 50% and 90%, respectively, are defined as D10, D50 and D90 particle diameters, respectively. The method of obtaining such a particle diameter is known, and for example, the relevant particle diameter can be obtained by laser diffraction or the like.

In one example, the particles may have the D50 particle diameter in the range of 1 to 10 μm. In another example, the D50 particle diameter may be about 1.2 μm or more, 1.4 μm or more, 1.6 μm or more, 1.8 μm or more, 2 μm or more, or 2.2 μm or more, or may be 9.5 μm or less, 9 μm or less, 8.5 μm or less, 8 μm or less, 7.5 μm or less, 7 μm or less, 6.5 μm or less, 6 μm or less, 5.5 μm or less, 5 μm or less, 4.5 μm or less, 4 μm or less, 3.5 μm or less, 3 μm or less, or 2.5 μm or less.

The particles may have a ratio (D90/D50) of the D90 particle diameter (D90) to the D50 particle diameter (D50) in a range of 1.5 to 5. In another example, the ratio (D90/D50) may be about 2 or more, or 2.5 or more, or may also be 4.5 or less, 4 or less, 3.5 or less, or 3 or less or so.

The particles may have a ratio (D50/D10) of the D50 particle diameter (D50) to the D10 particle diameter (D10)

in a range of 3.5 to 6. In another example, the ratio (D50/D10) may be about 4 or more, or may also be 5.5 or less, 5 or less, 4.5 or less, or 4 or less or so.

Particles having the hardness characteristics and particle size distribution characteristics as described above may impart appropriate thixotropy to the resin composition.

As the particles, various types may be applied without particular limitation as long as they have the above-mentioned particle size distribution as needed in addition to the above-described hardness characteristics, and there is no particular limitation on the shape thereof. The applicable particles can be exemplified by known clay particles, silica particles, $CaCO_3$ particles, $Al(OH)_3$ particles and/or ZnO particles, and the like. There is no great limitation on the kind that can be applied to the particles, and for example, all the particles having lower hardness than the thermally conductive particles to be applied may be applied.

In one example, the particles may be flame retardant particles. The present applicant has confirmed that various kinds of particles known as particulate flame retardants effectively satisfy the hardness characteristics and particle size distribution. When such flame retardant particles are applied, the effect of imparting flame retardancy to the resin composition or resin layer while securing thixotropy may also be exerted.

As the flame retardant particles, known flame retardant particles may be used without particular limitation, and for example, among components known as phosphorus particulate flame retardants, those satisfying the above hardness and/or particle size characteristics may be applied.

The ratio of the particles may be selected in consideration of the desired thixotropy, and the like, which is not particularly limited. In one example, the particles may be included in the resin composition in a ratio of about 5 to 30 parts by weight relative to 100 parts by weight of the curable resin or curing agent. In another example, the particles may be included in an amount of about 10 parts by weight or more, or about 13 parts by weight or more or so, or may also be included in an amount of about 25 parts by weight or less, or about 20 parts by weight or less or so.

The resin composition may also comprise various kinds of other components as long as it basically comprises the above-described components.

For example, the resin composition may further comprise a filler component known as a so-called thermally conductive filler. The term thermally conductive filler may mean a filler known to have a thermal conductivity of about 1 W/mK or more, 5 W/mK or more, 10 W/mK or more, or about 15 W/mK or more. The thermal conductivity of the thermally conductive filler may be about 400 W/mK or less, 350 W/mK or less, or about 300 W/mK or less. The type of the thermally conductive filler is not particularly limited, but an inorganic filler, such as a ceramic filler, may be applied when considering insulation properties or the like together. For example, ceramic particles such as alumina, AlN (aluminum nitride), BN (boron nitride), silicon nitride, SiC or BeO may be used. In addition to the foregoing, various types of fillers may be used. For example, in order for the resin composition to secure the insulation properties of the cured resin layer, the use of a carbon filler such as graphite may be considered. Alternatively, for example, a filler such as fumed silica, clay or calcium carbonate may be used.

The filler may be included in a very large content in the resin composition. For example, the filler may be used in a ratio of about 50 parts by weight or more, about 100 parts by weight or more, about 150 parts by weight or more, about 200 parts by weight or more, about 250 parts by weight or more, about 300 parts by weight or more, about 350 parts by weight or more, about 400 parts by weight or more, about 450 parts by weight or more, about 500 parts by weight or more, about 550 parts by weight or more, about 600 parts by weight or more, about 650 parts by weight or more, about 700 parts by weight or more, about 750 parts by weight or more, about 800 parts by weight or more, 820 parts by weight or more, or about 840 parts by weight or more relative to 100 parts by weight of the curable resin and/or curing agent. The filler may also be used in an amount of about 2,000 parts by weight or less, 1,800 parts by weight or less, or about 1,600 parts by weight or less relative to 100 parts by weight of the curable resin and/or curing agent.

For effectively maintaining viscosity characteristics, and the like, and more effectively using the desired thermal conductivity, insulation properties, and the like, even by application of an excessive amount of filler, at least three fillers having different average particle diameters may be applied as the filler.

For example, the thermally conductive filler may comprise at least a first inorganic filler having an average particle diameter in a range of about 1 μm to about 3 μm, a second inorganic filler having an average particle diameter in a range of about 15 μm to about 25 μm and a third inorganic filler having an average particle diameter in a range of about 35 μm to about 200 μm. The average particle diameter of the filler means the D50 particle diameter among the above-described particle diameters. In this case, when the total weight of the fillers is 100 parts by weight, the first inorganic filler may be included in about 15 to about 35 parts by weight or about 20 to about 30 parts by weight, the second inorganic filler may be included in about 25 to about 45 parts by weight or about 30 to about 40 parts by weight, and the third inorganic filler may be included in about 30 to about 50 parts by weight or about 35 to about 45 parts by weight.

By applying the three fillers having the particle diameters in the above ratios, it is possible to provide a resin composition in which handling properties are secured by exhibiting an appropriate viscosity even when high content fillers are filled.

The type of the inorganic filler is not particularly limited, which may be selected in consideration of the viscosity and thixotropy of the resin composition, the possibility of sedimentation in the resin composition, thermal conductivity, insulation properties, filling effect or dispersibility, and the like. For example, considering the amount to be filled, it is advantageous to use a spherical inorganic filler, but considering the formation of a network, conductivity, thixotropy, and the like, a non-spherical inorganic filler, for example, in the form of needles or plates, and the like may also be used.

In the present application, the term spherical particles mean particles having a sphericity of about 0.95 or more, and the non-spherical particles mean particles having a sphericity of less than 0.95. The sphericity can be confirmed through a particle shape analysis of particles.

In one example, in consideration of the above-described filling effect, all spherical fillers, that is, fillers having a sphericity of 0.95 or more may be used as the first to third inorganic fillers. In another example, at least one of the first to third inorganic fillers may be a non-spherical filler having a sphericity of less than 0.95.

The resin composition may contain other known additives in addition to the above components. Such an additive can be exemplified by the catalyst, a viscosity modifier, a diluent, a dispersant, a surface treatment agent or a coupling agent, and the like, but is not limited thereto.

As the catalyst, for example, a tin catalyst such as dibutyltin dilaurate (DBTDL) may be used. The catalyst may be included in an amount of 0.1 to 0.5 parts by weight relative to 100 parts by weight of the curable resin or curing agent included in the resin composition. In one example, the catalyst may be included in about 0.1 parts by weight or more, 0.15 parts by weight or more, or about 0.2 parts by weight or more, or may be included in about 0.5 parts by weight or less, 0.45 parts by weight or less, 0.4 parts by weight or less, 0.35 parts by weight or less, or about 0.3 parts by weight or less, relative to 100 parts by weight of the curable resin or curing agent.

As the dispersant, a compound type, nonionic, anionic or cationic dispersant, and the like may be used, and a fluorine-based, ester-based, cationic, anionic, nonionic, amphoteric surfactant, and the like may also be used, without particular limitation. In one example, a cationic dispersant having a phosphoric acid group or a phosphorous acid group may be used as the dispersant. The dispersant may be used in an amount of 0.01 parts by weight to 0.5 parts by weight relative to 100 parts by weight of the curable resin and/or curing agent.

As the flame retardant, a phosphorus-based flame retardant may be applied, and a liquid flame retardant, a solid flame retardant or a semi-solid flame retardant may be used at room temperature. The liquid phosphorus-based flame retardant is a flame retardant that exhibits a liquid state at room temperature, which may be a flame retardant having a melting point of less than room temperature, for example, less than about 30° C., less than 25° C., less than 20° C., less than 15° C., or less than 10° C. As one example of the liquid phosphorus-based flame retardant, a phosphate-based flame retardant such as resorcinol bis(diphenyl phosphate) may be used. The liquid phosphorus-based flame retardant may be included in about 5 parts by weight to 25 parts by weight relative to 100 parts by weight of the total resin content.

The diluent or dispersant is usually used to lower the viscosity of the resin composition, and as long as it can exhibit the action, various kinds of things known in the art may be used without limitation.

The surface treatment agent is for surface treatment of the filler, and as long as it can exhibit the action, various kinds of things known in the art may be used without limitation.

In the case of the coupling agent, for example, it may be used to improve dispersibility of the thermally conductive filler such as alumina, and as long as it can exhibit the action, various kinds of things known in the art may be used without limitation.

The above-described resin composition may exhibit excellent thixotropy. In one example, the resin composition may exhibit a thixotropic index of more than about 1. In another example, the thixotropic index may be about 1.2 or more, about 1.4 or more, about 1.6 or more, or about 1.8 or more, or may be about 10 or less, about 9 or less, about 8 or less, about 7 or less, about 6 or less, about 5 or less, about 5 or less, about 3.5 or less, or about 3.2 or less. Here, the thixotropic index is a ratio ($V_{0.25}/V_{2.5}$) of a viscosity ($V_{0.25}$) at a shear rate of 0.25/s to a viscosity ($V_{2.5}$) at a shear rate of 2.5/s, as measured by applying a rheometer (ARES).

When the thixotropic index value of the resin composition satisfies the above range, it is easy to fill and inject the composition in the injection equipment, so that appropriate processability can be secured.

The present application also relates to a method for preparing a resin composition.

The resin composition may basically be prepared by mixing the above-described curable resin or a curing agent for the resin with particles having the above-described characteristics.

In this mixing process, a predetermined pulverulent body is formed by contact between particles, and a desired thixotropic property can be secured by such a pulverulent body.

The present applicant has confirmed that the desired thixotropy can be more effectively secured by controlling the mixing method of the particles. For example, if the resin composition comprises the above-described thermally conductive filler and several types of fillers having different average particle diameters are applied as the filler, then it is effective in achieving the desired thixotropy that the particles are mixed together with the filler having the smallest average particle diameter.

Thus, the preparation method may comprise a first step of forming a mixture of the curable resin or a curing agent for the resin; the particles and the thermally conductive filler; and a second step of mixing the mixture of the first step with a thermally conductive filler having an average particle diameter larger than that of the thermally conductive filler of the first step. Here, the thermally conductive filler mixed in the first step may be the first thermally conductive filler among the first to third thermally conductive fillers as described above, and may be the second and/or third thermally conductive filler in the second step.

In such a preparation method, when other components other than the curable resin or curing agent, filler and particles are applied, there is no particular limitation on the order of addition thereof. For example, if the catalyst, dispersant and/or liquid flame retardant are applied among the above-mentioned components, a step of mixing the curable resin and the catalyst, then mixing the dispersant and the liquid flame retardant, and then mixing the filler and particles may be performed.

That is, if the above-mentioned order is observed when the above-described particles and the thermally conductive filler are mixed, other components may be mixed in an appropriate order according to the purpose, where even in the form of mixing, all amounts may be mixed at once or may also be divided appropriately and mixed.

The present application also relates to a resin layer comprising the resin composition as described above. Such a resin layer may be a resin layer formed by curing the resin composition. That is, when the resin composition is a one-component type, the relevant resin composition may be cured on its own to form the resin layer, and when it is a two-component type, the main material and the curing agent composition may also be mixed and then cured to form the resin layer.

Such a resin layer is a thermally conductive resin layer, which may have a thermal conductivity of about 2 W/mK or more, 2.5 W/mK or more, 3 W/mK or more, 3.5 W/mK or more, or about 4 W/mK or more. The thermal conductivity may be about 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. The thermal conductivity of the resin layer is a value measured according to, for example, ASTM D5470 standard or ISO 22007-2 standard. The thermal conductivity of such a resin layer can be secured by appropriately adjusting the filler and its content ratio.

In another example, the resin layer may have a predetermined adhesive strength (S1) before or after curing. Specifically, the resin layer formed by curing the two-component resin composition may have an adhesive strength of about 150 gf/10 mm or more, 200 gf/10 mm or more, 250 gf/10 mm or more, 300 gf/10 mm or more, 350 gf/10 mm or more, or about 400 gf/10 mm or more. When the adhesive strength satisfies the above range, appropriate impact resistance and vibration resistance can be secured. The upper limit of the adhesive strength of the resin layer is not particularly limited, which may be, for example, about 1,000 gf/10 mm or less, 900 gf/10 mm or less, 800 gf/10 mm or less, 700 gf/10 mm or less, 600 gf/10 mm or less, or about 500 gf/10 mm or less or so. If the adhesive strength is too high, there is a risk that the pouch portion, which is attached to the cured two-component resin composition, is torn. Specifically, in the event of a shock enough to deform the shape of a battery module due to an accident while driving a car, if the battery cell is attached too strongly through the cured resin layer, the dangerous substances inside the battery may be exposed or exploded while the pouch is torn. The adhesive strength may be measured for an aluminum pouch. For example, the adhesive strength may be measured by cutting an aluminum pouch used for manufacturing a battery cell to a width of about 10 mm, loading a two-component resin composition on a glass plate, loading the cut aluminum pouch thereon so that the two-component resin composition contacts the PET (poly(ethylene terephthalate)) side of the pouch, and then curing the two-component resin composition under conditions of 25° C. and 50% RH for 24 hours, and peeling the aluminum pouch at a peel angle of 180° and a peel rate of 300 mm/min with a tensile tester (Texture analyzer).

In another example, the adhesive strength of the two-component resin composition after curing may be maintained at a considerable level even under high temperature/high humidity, as described in Examples below. Specifically, in the present application, the % ratio [(S2/S1)×100] of the adhesive strength (S2) measured by the same method after performing a high temperature/high humidity acceleration test performed under a predetermined condition to the adhesive strength (S1) after curing measured at room temperature, may be 70% or more, or 80% or more. In one example, the high temperature/high humidity acceleration test may be measured after storing the same specimen as the specimen used to measure the room temperature adhesive strength under conditions of a temperature of 40 to 100° C. and humidity condition of 75% RH or more for 10 days. When the adhesive strength and relationship are satisfied, excellent adhesion durability can be maintained even when the use environment of the battery module changes.

In another example, the two-component resin composition may have excellent heat resistance after curing. In this regard, the two-component resin composition of the present application may have a 5% weight loss temperature of 120° C. or more upon a thermogravimetric analysis (TGA) measured for the cured product of only the resin component without any filler. In addition, the two-component resin composition of the present application may have a remaining amount at 800° C. of 70 weight % or more upon a thermogravimetric analysis (TGA) measured for the cured product of the two-component resin composition with a filler. In another example, the remaining amount at 800° C. may be about 75 weight % or more, about 80 weight % or more, about 85 weight % or more, or about 90 weight % or more. In another example, the remaining amount at 800° C. may be about 99 weight % or less. At this time, the thermogravimetric analysis (TGA) may be measured in a range of 25 to 800° C. at a temperature increase rate of 20° C./min under a nitrogen ($N_2$) atmosphere of 60 $cm^3$/min. Heat resistance properties related to the thermogravimetric analysis (TGA) can be secured by adjusting the type or content of resins and/or fillers.

In one example, the two-component resin composition may have excellent electrical insulation properties after curing. When the resin layer exhibits predetermined electrical insulation properties in the battery module structure as described below, the performance of the battery module can be maintained and stability can be ensured. For example, the cured product of the two-component resin composition may have a dielectric breakdown voltage of about 10 kV/mm or more, 15 kV/mm or more, or about 20 kV/mm or more, measured according to ASTM D149. The higher the value of the dielectric breakdown voltage, the resin layer exhibits excellent insulation properties, which is not particularly limited, but considering the composition of the resin layer, and the like, it may be about 50 kV/mm or less, 45 kV/mm or less, 40 kV/mm or less, 35 kV/mm or less, or about 30 kV/mm or less. The dielectric breakdown voltage in the above range can be secured, for example, by adjusting the contents of the filler and resin components as described above.

The present application also relates to a battery module. The module comprises a module case and a battery cell. The battery cell may be housed in the module case. One or more battery cells may be present in the module case, and a plurality of battery cells may be housed in the module case. The number of battery cells housed in the module case is adjusted according to the use or the like, which is not particularly limited. The battery cells housed in the module case may be electrically connected to each other.

The module case may comprise at least sidewalls and a bottom plate forming an inner space in which the battery cells can be housed. In addition, the module case may further comprise a top plate sealing the inner space. The sidewalls, the bottom plate and the top plate may be integrally formed with each other, or the module case may be formed by assembling the separated sidewalls, bottom plate and/or top plate, respectively. The shape and size of the module case are not particularly limited, which may be appropriately selected according to the use or the shape and number of battery cells housed in the inner space.

Here, since at least two plates constituting the module case exist, the terms top plate and bottom plate are terms of relative concepts used to distinguish them. That is, it does not mean that in the actual use state, the top plate must be present on the upper part and the bottom plate must be present on the lower part.

FIG. 1 is a diagram showing an exemplary module case (10), which is an example of a case (10) in the form of a box including one bottom plate (10a) and four sidewalls (10b). The module case (10) may further comprise a top plate (10c) sealing the inner space.

FIG. 2 is a schematic diagram of the module case (10) of FIG. 2 in which battery cells (20) are housed, as viewed from above.

Holes may be formed in the bottom plate, sidewalls and/or top plate of the module case. When the resin layer is formed by an injection process, the hole may be an injection hole used to inject a material for forming the resin layer, that is, a two-component resin composition. The shape, number and position of the holes may be adjusted in consideration of the injection efficiency of the material for forming the resin layer. In one example, the hole may be formed in at least the bottom plate and/or the top plate.

In one example, the hole may be formed at about ¼ to ¾ point, about ⅜ to ⅞ point, or approximately at the middle part of the total length of the sidewall, the bottom plate or the top plate. By injecting the two-component resin composition through the injection hole formed at this point, it can be injected so that the resin layer has a wide contact area. As shown in FIG. 3, the ¼, ¾, ⅜ or ⅞ point is, for example, the ratio of the distance (A) to the formation position of the hole relative to the total length (L) measured based on any one end surface (E) of the bottom plate, and the like. Here, the end (E) where the length (L) and the distance (A) are formed may also be any end (E) as long as the length (L) and the distance (A) are measured from the same end (E). In FIG. 3, the injection hole (50a) is in a shape located approximately at the middle part of the bottom plate (10a).

The size and shape of the injection hole are not particularly limited, which may be adjusted in consideration of the injection efficiency of the resin layer material to be described below. For example, the hole may be in the form of a circle, polygonal or amorphous, such as a circle, an oval, a polygon such as a triangle or a tetragon, or amorphism. The number of injection holes and their spacing are not particularly limited, which may be adjusted such that the resin layer has a large contact area with the bottom plate, as described above.

Observation holes (for example, (50b) in FIG. 3) may be formed at ends of the top plate and the bottom plate in which the injection holes are formed. Such an observation hole may be formed to observe whether the injected material is well injected to the end of the relevant sidewall, bottom plate or top plate, for example, when the resin layer material is injected through the injection hole. The position, shape, size and number of the observation holes are not particularly limited as long as they are formed such that it can be confirmed whether the injected material is properly injected.

The module case may be a thermally conductive case. The term thermally conductive case means a case having a thermal conductivity of 10 W/mK or more in the entire case, or including a portion having at least the same thermal conductivity as above. For example, at least one of the above-described sidewalls, bottom plate and top plate may have the above-described thermal conductivity. In another example, at least one of the sidewalls, bottom plate and top plate may comprise a portion having the thermal conductivity. For example, the battery module of the present application may comprise a first filler-containing cured resin layer in contact with the top plate and the battery cell, and a second filler-containing cured resin layer in contact with the bottom plate and the battery cell, where the second filler-containing cured resin layer may be a thermally conductive resin layer, and accordingly, at least the bottom plate may have thermal conductivity or may include a thermally conductive portion.

Here, in another example, the thermal conductivity of the thermally conductive top plate, bottom plate, sidewalls, or thermally conductive portion may be about 20 W/mK or more, 30 W/mK or more, 40 W/mK or more, 50 W/mK or more, 60 W/mk or more, 70 W/mK or more, 80 W/mK or more, 90 W/mK or more, 100 W/mK or more, 110 W/mK or more, 120 W/mK or more, 130 W/mK or more, 140 W/mK or more, 150 W/mK or more, 160 W/mK or more, 170 W/mK or more, 180 W/mK or more, 190 W/mK or more, or about 195 W/mK or more. The higher the value of the thermal conductivity, the more advantageous it is in terms of heat dissipation characteristics of the module, whereby the upper limit is not particularly limited. In one example, the thermal conductivity may be about 1,000 W/mK or less, 900 W/mK or less, 800 W/mK or less, 700 W/mK or less, 600 W/mK or less, 500 W/mK or less, 400 W/mK or less, 300 W/mK or about 250 W/mK or less, but is not limited thereto. The type of material exhibiting the above thermal conductivity is not particularly limited, and for example, includes metal materials such as aluminum, gold, silver, tungsten, copper, nickel or platinum. The module case may be entirely made of the thermally conductive material as above, or at least a portion may be a portion made of the thermally conductive material. Accordingly, the module case may have a thermal conductivity in the above-mentioned range or comprise at least one portion of portions having the above-mentioned thermal conductivity.

In the module case, the portion having the thermal conductivity in the above range may be a portion in contact with the resin layer and/or the insulating layer. In addition, the portion having the thermal conductivity may be a portion in contact with a cooling medium such as cooling water. When it has such a structure, heat generated from the battery cell can be effectively discharged to the outside.

In the present application, the term battery cell means one unitary secondary battery including an electrode assembly and an exterior material.

The type of battery cells housed in the battery module case is not particularly limited, and various known battery cells may be all applied. In one example, the battery cell may be in a pouch type.

The battery module of the present application may further comprise a resin layer. Specifically, the battery module of the present application may comprise a cured resin layer in which the filler-containing composition is cured. The cured resin layer may be formed from the above-described two-component resin composition.

The battery module may comprise, as the resin layer, a first cured resin layer in contact with the top plate and battery cells, and a second cured resin layer in contact with the bottom plate and battery cells. One or more of the first and second cured resin layers may comprise a cured product of the two-component resin composition as described above, thereby having a predetermined adhesive strength, cold resistance, heat resistance, and insulation properties as described above.

In addition, the first and second cured resin layers may be thermally conductive resin layers. In this case, the thermal conductivity of the thermally conductive resin layer may be about 1.5 W/mK or more, 2 W/mK or more, 2.5 W/mK or more, 3 W/mK or more, 3.5 W/mK or more, or about 4 W/mK or more. The thermal conductivity may be about 50 W/mK or less, 45 W/mK or less, 40 W/mK or less, 35 W/mK or less, 30 W/mK or less, 25 W/mK or less, 20 W/mK or less, 15 W/mk or less, 10 W/mK or less, 5 W/mK or less, 4.5 W/mK or less, or about 4.0 W/mK or less. When the resin layer is a thermally conductive resin layer as above, the bottom plate, the top plate and/or the sidewall, and the like, to which the resin layer is attached, may be portions having a thermal conductivity of 10 W/mK or more. At this time, the portion of the module case showing the thermal conductivity may be a portion in contact with a cooling medium, for example, cooling water. The thermal conductivity of the resin layer is a value measured according to, for example, ASTM D5470 standard or ISO 22007-2 standard. The thermal conductivity of the resin layer as above can be secured, for example, by appropriately adjusting the filler contained in the resin layer and the content ratio thereof, as described above.

In addition, the resin layer may be a flame retardant resin layer. In the present application, the term flame retardant resin layer may mean a resin layer exhibiting a V-0 rating in the UL 94 V Test (vertical burning test). Through this, stability against fire and other accidents that may occur in the battery module can be secured.

In the battery module of the present application, at least one of the sidewalls, bottom plate and top plate in contact with the resin layer may be the above-described thermally conductive sidewall, bottom plate or top plate. Meanwhile, in this specification, the term contact may also mean, for example, a case where the resin layer and the top plate, the bottom plate and/or the sidewall or the battery cell are in direct contact, or other elements, such as an insulating layer, are present therebetween. Furthermore, the resin layer in contact with the thermally conductive sidewall, bottom plate or top plate may be in thermal contact with the relevant object. At this time, the thermal contact may mean a state where the resin layer is in direct contact with the bottom plate or the like, or other elements, such as an insulating layer to be described below, exist between the resin layer and the bottom plate or the like, but heat transfer from the battery cell to the resin layer and from the resin layer to the bottom plate or the like is not obstructed by the other elements. Here, the matter that heat transfer is not obstructed means a case that even when other elements (for example, an insulating layer or a guiding part to be described below) exist between the resin layer and the bottom plate or the like, the total thermal conductivity of the other elements and the resin layer is about 1.5 W/mK or more, 2 W/mK or more, 2.5 W/mK or more, 3 W/mK or more, 3.5 W/mK or more, or about 4 W/mK or more, or the total thermal conductivity of the resin layer and the bottom plate or the like in contact therewith is included in the above range even when the other elements are present. The thermal conductivity of the thermal contact may be about 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. When the other elements exist, this thermal contact can be achieved by controlling the thermal conductivity and/or thickness of the other elements.

The thermally conductive resin layer may be in thermal contact with the bottom plate or the like, and may also be in thermal contact with the battery cell. Through adoption of such a structure, it is possible to implement a module in which heat dissipation characteristics are secured and more battery cells are housed per unit volume, while significantly reducing various fastening parts or cooling equipment of modules that were previously required when configuring a general battery module or a battery pack which is an assembly of such modules. Accordingly, in the present application, a smaller, lighter, and high-output battery module can be provided.

FIG. 4 is an exemplary cross-sectional diagram of the battery module. In FIG. 4, the module may be in a shape comprising: a case (10) including sidewalls (10b) and a bottom plate (10a); a plurality of battery cells (20) housed in the case and a resin layer (30) in contact with both the battery cells (20) and the case (10). FIG. 4 is a diagram of the resin layer (30) present on the bottom plate (10a) side, but the battery module of the present application may also comprise a resin layer positioned on the top plate side in the same shape as in FIG. 4.

In the above structure, the bottom plate or the like in contact with the resin layer (30) may be a thermally conductive bottom plate or the like as described above.

The contact area between the resin layer and the bottom plate or the like may be about 70% or more, 75% or more, 80% or more, 85% or more, 90% or more, or about 95% or more relative to the total area of the bottom plate or the like.

The upper limit of the contact area is not particularly limited, which may be, for example, 100% or less, or less than about 100%.

When the top plate or the bottom plate is thermally conductive and the cured resin layer in contact therewith is also thermally conductive, the thermally conductive portion or the thermally conductive bottom plate, and the like may be a portion in contact with a cooling medium such as cooling water. That is, as schematically shown in FIG. 4, heat (H) can be easily discharged to the bottom plate or the like by such a structure, and by contacting such a bottom plate or the like with the cooling medium (CW), evolution of heat can be easily achieved even in a more simplified structure.

Each of the resin layers may have a thickness, for example, in a range of about 100 μm to about 5 mm or in a range of about 200 μm to about 5 mm. In the structure of the present application, the thickness of the resin layer may be set to an appropriate thickness in consideration of desired heat dissipation properties or durability. The thickness may be the thickness of the thinnest portion of the resin layer, the thickness of the thickest portion, or the average thickness.

As shown in FIG. 4, a guiding part (10d) capable of guiding the housed battery cell (20) may also be present on at least one surface inside the module case (10), for example, a surface (10a) in contact with the resin layer (30). At this time, the shape of the guiding part (10d) is not particularly limited, and an appropriate shape may be employed in consideration of the shape of the applied battery cell and the like. The guiding part (10d) may be integrally formed with the bottom plate or the like, or may be separately attached. The guiding part (10d) may be formed of a thermally conductive material, for example, a metal material such as aluminum, gold, silver, tungsten, copper, nickel, or platinum in consideration of the aforementioned thermal contact. In addition, although not shown in the drawings, a slip sheet or an adhesive layer may be present between the housed battery cells (20). Here, the slip sheet may serve as a buffer during charging and discharging of the battery cell.

In one example, the battery module may further comprise an insulating layer between the module case and the battery cell or between the resin layer and the module case. FIG. 5 exemplarily shows a case where the insulating layer (40) is formed between the guiding part (10d) formed on the bottom plate (10a) of the case and the resin layer (30). By adding the insulating layer, it is possible to prevent problems such as electric short or fire due to contact between the cell and the case due to impact that may occur during use processes. The insulating layer may be formed using an insulating sheet having high insulation properties and thermal conductivity, or may be formed by coating or injection of a material exhibiting insulation properties. For example, a process of forming an insulating layer may be performed prior to injection of the two-component resin composition. A so-called TIM (thermal interface material) or the like may be applied to formation of the insulating layer. In another way, the insulating layer may be formed of an adhesive material, and for example, the insulating layer may also be formed using a resin layer with a little or no content of a filler such as a thermally conductive filler. A resin component that can be used to form the insulating layer can be exemplified by an acrylic resin, PVC (poly(vinyl chloride)), an olefin resin such as PE (polyethylene), an epoxy resin, silicone, or a rubber component such as an EPDM (ethylene propylene diene monomer) rubber, but is not limited thereto. The insulating layer may have a dielectric breakdown voltage of about 5 kV/mm or more, 10 kV/mm or more, 15 kV/mm or more, 20 kV/mm or more, 25 kV/mm or more, or about 30 kV/mm or more, as measured in accordance with ASTM D149. The higher the value of the dielectric breakdown voltage, it exhibits more excellent insulation properties, which is not particularly limited. For example, the dielectric breakdown voltage of the insulating layer may be about 100 kV/mm or less, 90 kV/mm or less, 80 kV/mm or less, 70 kV/mm or less, or about 60 kV/mm or less. The thickness of the insulating layer may be set to an appropriate range in consideration of insulation properties or thermal conductivity, and the like, which may be, for example, about 5 μm or more, 10 μm or more, 20 μm or more, 30 μm or more, 40 μm or more, 50 μm or more, 60 μm or more, 70 μm or more, 80 μm or more, or about 90 μm or more or so. In addition, the upper limit of the thickness is not particularly limited, which may be, for example, about 1 mm or less, 200 μm or less, 190 μm or less, 180 μm or less, 170 μm or less, 160 μm or less, or about 150 μm or less.

The present application also relates to a battery pack, for example, a battery pack comprising two or more of the aforementioned battery modules. In the battery pack, the battery modules may be electrically connected to each other. A method of configuring a battery pack by electrically connecting two or more battery modules is not particularly limited, where all known methods may be applied.

The present application also relates to a device comprising the battery module or the battery pack. An example of the device may include a vehicle such as an electric vehicle, but is not limited thereto, and all applications requiring a secondary battery as an output may be included. For example, a method of configuring the vehicle using the battery pack is not particularly limited, where a general method may be applied.

Advantageous Effects

The present application may provide a resin composition securing excellent thixotropy while having one or more excellent properties selected from thermal conductivity, adhesiveness, insulation properties, tensile characteristics, hardness and flame retardancy, a preparation method thereof and a use thereof.

MODE FOR INVENTION

Figure 1:
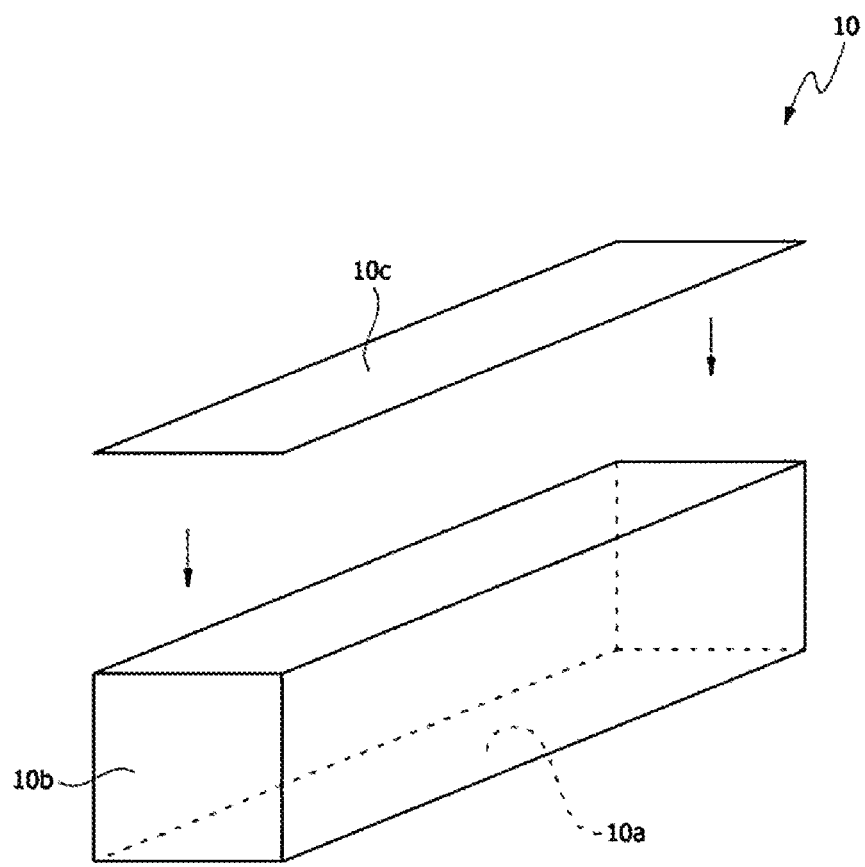
FIG. 1 shows an exemplary module case applicable in the present application.
Figure 2:
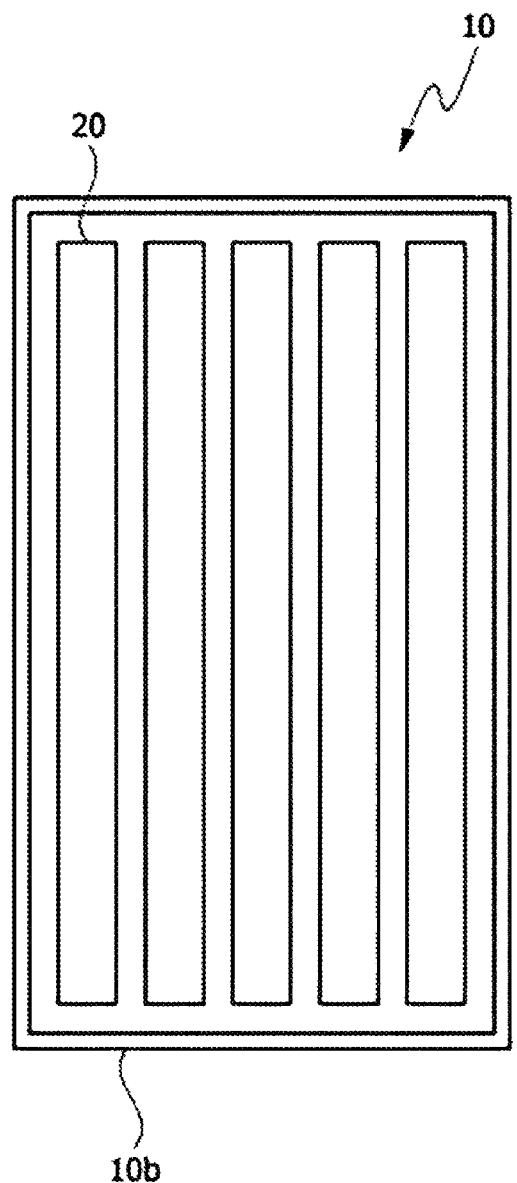
FIG. 2 schematically shows a form in which battery cells are housed in a module case.
Figure 3:
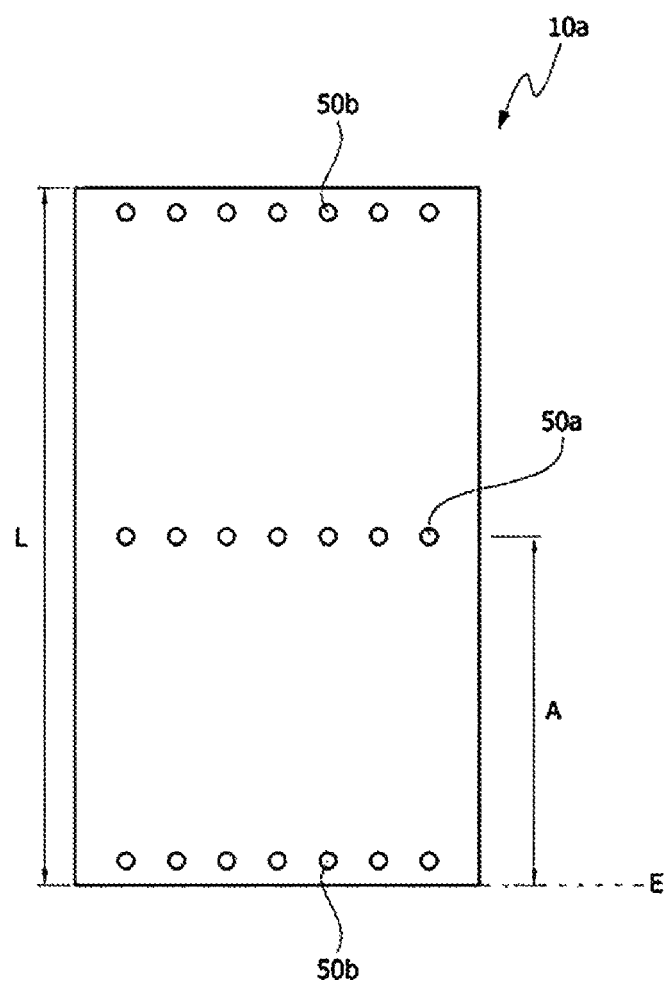
FIG. 3 schematically shows an exemplary bottom plate in which injection holes and observation holes are formed.
Figure 4:
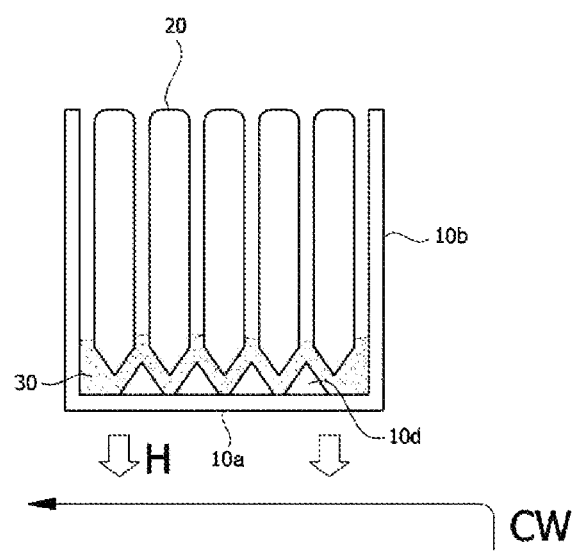
FIGS. 4 and 5 schematically show a structure of an exemplary battery module.
Figure 5:
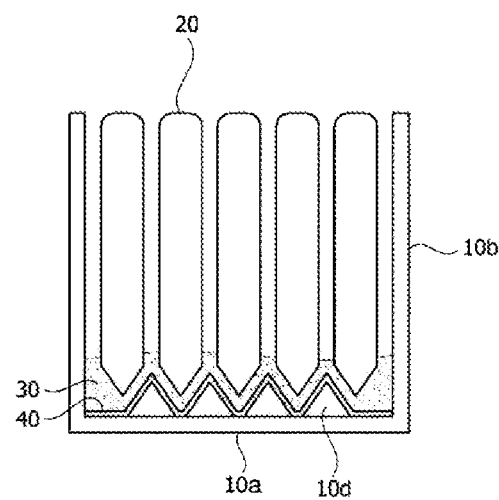

Hereinafter, the present application will be described in detail through examples, but the scope of the present application is not limited by the following examples.

1. Particle Size Distribution of Particles

The particle size distribution of the particles (FR-119L) applied in the examples was evaluated by a laser analysis method. It was evaluated in a standard manner by applying a particle size distribution analyzer (PSA) (Model Mastersizer 300, Malvem Instruments LTD) as a measuring instrument. The manner uses lasers, where the incident lasers are scattered, transmitted and absorbed by particles and particularly, among the scattered light, diffracting, refracting and reflecting light exists. In some cases, a portion of the absorbed light is also emitted as light with a different wavelength. These phenomena occur simultaneously and multiply, where in the standard manner using the measuring instrument, the degree of light scattering is detected and the particle size distribution is measured as such. In the measurement methods, there are a wet method for measuring it by dispersing particles in a solvent, and a dry method for measuring it in a powder state, where in the present application, the wet method was applied. Ethanol was applied as the solvent, and the dispersion concentration was in the range of approximately 1 to 5 weight %.

2. Evaluation of Particle Size Distribution after Milling

The particles (FR-119L) applied in the examples and zirconia beads having a diameter of 1 mm were dispersed in ethanol, and then milled by shaking at a speed of 200 RPM. The milling was performed for 20 hours, and when mixing, the total volume of the zirconia beads was mixed so that it was set to a level of ⅓ or so relative to the total volume of the flame retardant. After the milling, the mixture was washed with ethanol to separate the zirconia beads, and then the particle size distribution of the particles was measured in the same manner as described above.

3. Viscosity of Resin Composition

The viscosity of the resin composition can be measured using an HB type viscometer. Here, it is measured while changing the shear rate from 0.01/s to 10.0/s with the HB type viscometer. Unless otherwise specified, the viscosity value is a value at a shear rate of 2.5/s, and the thixotropic index is the ratio of the viscosities at the point of 0.1/s and the point of 1.0/s.

Example 1

Specific details of components applied during preparation of a resin composition were summarized below, and the method of preparing the resin composition using them was as follows, and mixing in the following preparation method was performed with a planetary mixer. Also, in the following preparation method, a curable resin is divided into three times in total and dividedly added, and finally, when the amount of the curable resin present in the resin composition is 100 parts by weight, the weight ratio of the primary, secondary and tertiary curable resins which are added is approximately 50 to 55:25:25 to 20 (primary:secondary:tertiary). Furthermore, in the following, an alumina filler was mixed in an amount of approximately 900 parts by weight relative to 100 parts by weight of the total curable resin component, where the weight ratio of the alumina filler having average particle diameters (D50) of approximately 2 μm, 20 μm and 40 μm was set to approximately 3:3:4 or so (2 μm:20 μm:40 μm).

First, as a first step, the following curable resin was mixed with a catalytic amount of catalyst (addition of the primary curable resin). Thereafter, the following dispersant and liquid flame retardant were mixed in an appropriate ratio into the mixture.

Then, a spherical alumina filler (first thermally conductive filler) having an average particle diameter (D50) of approximately 2 μm and the following particles (FR-119L) were mixed into the mixture. Here, the particles (FR-119L) were mixed in about 15 parts by weight.

Then, a mixture of the same curable resin as contained in the mixture and a spherical alumina filler (second thermally conductive filler) having an average particle diameter (D50) of approximately 20 µm was further mixed into the mixture (addition of the secondary curable resin).

Then, a mixture of the same curable resin as contained in the mixture and a spherical alumina filler (third thermally conductive filler) having an average particle diameter (D50) of approximately 40 µm was further mixed into the mixture (addition of the tertiary curable resin) and defoamed in vacuum to prepare a resin composition.

In the resin composition prepared as described above, the viscosity (shear rate: based on 2.5/s) at room temperature was about 230,000 kcP, and the thixotropic index was about 2 or so.

<Resin Composition Components>

Curable resin: polyol compound obtained by esterification of butanediol and caprolactone in a weight ratio of 1:2.78 (butanediol:caprolactone)

Catalyst: DBTDL (dibutyltin dilaurate) (Songwon Industries, TL-100)

Dispersant: DISPERBYK-111 (BYK).

Liquid flame retardant: Liquid phosphorus flame retardant (Oceanchem, resorcinol bis(diphenyl phosphate)).

Particles: Particulate phosphorus flame retardant (aluminum hydroxymethylphenylphosphinate) (X-Guard FR-119L)

Figure 6:
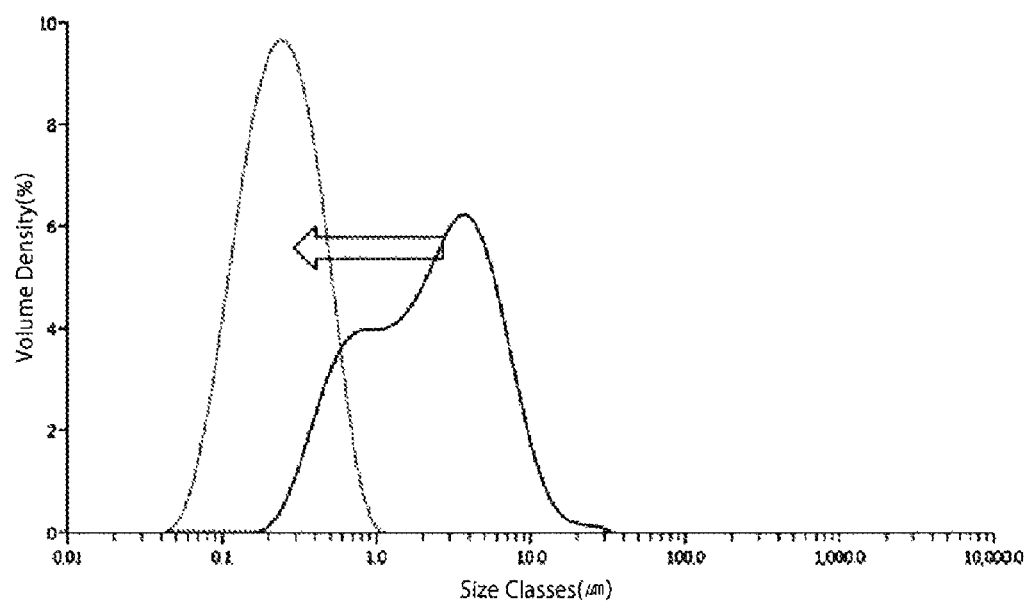
FIG. 6 is a view showing a change in particle size distribution of particles.

The particle size distribution changes of the particles before and after the above-described milling were summarized in Table 1 below, and such a particle size distribution change curve was shown in FIG. 6. In FIG. 6, the arrow direction is shown in a direction proceeding from the curve before milling to the curve after milling.

TABLE 1

|  | D10 particle diameter (µm) | D50 particle diameter (µm) | D90 particle diameter (µm) |
| --- | --- | --- | --- |
| Before milling | 0.534 | 2.33 | 6.93 |
| After milling | 0.108 | 0.235 | 0.491 |

Comparative Example 1

A resin composition was prepared in the same manner as in Example 1, except that particles were not applied. In this case, the thixotropic index at the initial stage of preparation was approximately 1 or so, whereby there was almost no thixotropy, and the uniform mixing of the curable resin and the filler was not achieved due to sedimentation of the filler or the like over time.

The invention claimed is:

1. A resin composition, comprising:
a curable resin or a curing agent;
particles, and
thermally conductive fillers,
wherein the curable resin is a polyol compound,
the thermally conductive fillers comprise ceramic fillers,
the particles are comprised in an amount of 5 to 30 parts by weight relative to 100 parts by weight of the curable resin or the curing agent,
the thermally conductive fillers are comprised in an amount of 50 parts by weight or more relative to 100 parts by weight of the curable resin or the curing agent, and
the particles have the D50 particle diameter in a range of 1 to 10 µm, and have a ratio (D90/D50) of a D90 particle diameter to the D50 particle diameter in a range of 1.5 to 5, and the particles have a change rate of a D50 particle diameter in a range of −95% to −80% after milling with zirconium beads having a particle diameter of 1 mm for 20 hours.

2. The resin composition according to claim 1, wherein the particles have a change rate of a D10 particle diameter in a range of −85% to −70% after milling with the zirconium beads having the particle diameter of 1 mm for 20 hours.

3. The resin composition according to claim 1, wherein the particles have a change rate of a D90 particle diameter in a range of −95% to −80% after milling with the zirconium beads having the particle diameter of 1 mm for 20 hours.

4. The resin composition according to claim 1, wherein the curing agent is an isocyanate compound.

5. The resin composition according to claim 1, wherein the particles have a ratio (D50/D10) of the D50 particle diameter to a D10 particle diameter in a range of 3.5 to 6.

6. The resin composition according to claim 1, wherein the resin composition has a thixotropic index value of 1 to 4, wherein the thixotropic index value is a ratio (V0.25/V2.5) of a viscosity (V0.25) at a shear rate of 0.25/s to a viscosity (V2.5) at a shear rate of 2.5/s, at room temperature.

7. A method for preparing the resin composition of claim 1, the method comprising:
mixing the curable resin or the curing agent with the particles and the thermally conductive fillers.

8. A method for preparing a resin composition comprising:
mixing a curable resin or a curing agent with particles and thermally conductive fillers to form a first mixture, and
mixing the first mixture with a second thermally conductive filler having an average particle diameter larger than that of the thermally conductive fillers,
wherein the curable resin is a polyol compound,
the thermally conductive fillers comprise ceramic fillers,
the particles are comprised in an amount of 5 to 30 parts by weight relative to 100 parts by weight of the curable resin or the curing agent,
the thermally conductive fillers are comprised in an amount of 50 parts by weight or more relative to 100 parts by weight of the curable resin or the curing agent, and
the particles have the D50 particle diameter in a range of 1 to 10 µm, and have a ratio (D90/D50) of a D90 particle diameter to the D50 particle diameter in a range of 1.5 to 5, and the particles have a change rate of a D50 particle diameter in a range of −95% to −80% after milling with zirconium beads having a particle diameter of 1 mm for 20 hours.

9. A battery module, comprising:
a module case having a top plate, a bottom plate, and sidewalls;
a plurality of battery cells; and
a resin layer,
wherein an inner space is formed by the top plate, the bottom plate and the sidewalls;
wherein the plurality of battery cells is in the inner space of the module case,
wherein the resin layer comprises the resin composition of claim 1 and is in contact with the plurality of battery cells and the bottom plate or the sidewall.

10. A battery pack, comprising two or more of the battery module of claim 9, wherein the two or more battery modules are electrically connected to each other.

11. A vehicle comprising the battery pack of claim 10.

\* \* \* \* \*